United States Patent
Williams et al.

(10) Patent No.: US 9,016,099 B2
(45) Date of Patent: Apr. 28, 2015

(54) HYBRID HYDRODYNAMIC AND HYDROSTATIC BEARING BUSHING AND LUBRICATION SYSTEM FOR ROLLING MILL

(75) Inventors: Mortimer Williams, Sturbridge, MA (US); Thomas C. Wojtkowski, Jr., Shrewsbury, MA (US); Robert Mase, Spencer, MA (US); Peter N. Osgood, Westborough, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 774 days.

(21) Appl. No.: 13/248,354

(22) Filed: Sep. 29, 2011

(65) Prior Publication Data
US 2013/0081438 A1    Apr. 4, 2013

(51) Int. Cl.
| | |
|---|---|
| B21B 45/02 | (2006.01) |
| B21B 31/07 | (2006.01) |
| F16C 32/06 | (2006.01) |
| F16C 33/10 | (2006.01) |
| F16C 17/02 | (2006.01) |

(52) U.S. Cl.
CPC .......... B21B 31/074 (2013.01); F16C 32/0659 (2013.01); F16C 32/0666 (2013.01); F16C 33/107 (2013.01); F16C 17/02 (2013.01); F16C 2322/12 (2013.01); F16C 32/0685 (2013.01)

(58) Field of Classification Search
CPC .. B21B 45/0239; B21B 31/074; B21B 45/02; F16C 33/04; F16C 33/10; F16C 33/101; F16C 33/1025; F16C 33/1045; F16C 33/106; F16C 33/108; F16C 33/1085; B23Q 11/12; B23Q 11/121

USPC .......... 72/41, 43, 236, 245, 252.5; 492/1, 47, 492/48; 384/100, 11, 115, 118, 276, 281, 384/289, 290; 184/6.14
See application file for complete search history.

(56) References Cited

U.S. PATENT DOCUMENTS

| | | | | |
|---|---|---|---|---|
| 2,692,803 | A | * | 10/1954 | Gerard .......................... 384/118 |
| 3,395,952 | A | * | 8/1968 | Deffrenne ..................... 384/118 |
| 3,934,948 | A | * | 1/1976 | Pruvot .......................... 384/111 |
| 3,945,692 | A | * | 3/1976 | Tsujiuchi ...................... 384/120 |
| 5,000,584 | A | | 3/1991 | Simmons |
| 5,433,528 | A | | 7/1995 | San Andres |

(Continued)

FOREIGN PATENT DOCUMENTS

| | | |
|---|---|---|
| EP | 1447472 A1 | 8/2004 |
| WO | 2005017377 A1 | 2/2005 |

OTHER PUBLICATIONS

PCT International Search Report mailed Jul. 3, 2013 corresponding to PCT International Application No. PCT/US2012/056020 filed Sep. 19, 2012. (11 pages).

Primary Examiner — Edward Tolan

(57) ABSTRACT

Rolling mill bearings incorporate bearing bushings with pluralities of hydrostatic pad recesses, that are preferably in conjunction hydrodynamic bearings also formed within the bushing. Each recess has an isolated lubricant passage that is adapted for coupling to a separate isolated source of pressurized lubricant. In some embodiments herein, the isolated pressurized lubricant source is supplied by a dedicated outlet of a pressure pump. In this manner each hydrostatic pad recess has a dedicated pressurized lubricant supply that is not interrupted by loss of lubricant pressure events in other bearing pads or elsewhere within the rolling mill lubrication system.

11 Claims, 5 Drawing Sheets

(56) References Cited

U.S. PATENT DOCUMENTS

| | | | |
|---|---|---|---|
| 5,556,207 A * | 9/1996 | Daniel | 384/115 |
| 5,759,354 A * | 6/1998 | Graf | 162/308 |
| 5,769,545 A * | 6/1998 | Bently et al. | 384/118 |
| 5,871,285 A * | 2/1999 | Wasson | 384/118 |
| 6,053,636 A * | 4/2000 | Pelfrey et al. | 384/114 |
| 6,186,061 B1 * | 2/2001 | Burns et al. | 100/282 |
| 6,216,977 B1 * | 4/2001 | Setzer et al. | 242/573.7 |
| 6,468,194 B2 | 10/2002 | Osgood | |
| 6,547,438 B2 * | 4/2003 | Shima | 384/100 |
| 2006/0219481 A1 * | 10/2006 | Russell | 184/6.19 |
| 2010/0166347 A1 * | 7/2010 | Wendling | 384/114 |

* cited by examiner

HYBRID HYDRODYNAMIC AND HYDROSTATIC BEARING BUSHING AND LUBRICATION SYSTEM FOR ROLLING MILL

BACKGROUND

1. Field

Embodiments of the present invention relate to rolling mill stand fluid lubricated bearings supporting roll necks of rotating rollers that are used to roll metals into elongated webs. More particularly, embodiments of the present invention relate to hybrid bearings having hydrostatic fluid bearing pads within hydrodynamic bearing bushings and lubrication systems that provide an isolated source of pressurized lubricant to each respective bearing pad.

2. Description of the Prior Art

FIG. 1 shows a known rolling mill stand bearing assembly 10 that is rotatively supporting a rotating mill roll 12 by a roll neck section 14 and a complimentary rotating bearing sleeve 16. The bearing assembly 10 is supported by a bearing chock 18 that is in turn supported in a mill roll stand (not shown). A bearing bushing 20 is interposed between the roll neck 14/bearing sleeve 16 and the bearing chock 18 and is fixed in the chock. The bearing bushing 20 provides a hydrodynamic bearing surface for full hydrodynamic lubrication (i.e., a self-generated pressurized fluid lubricant film layer between the bearing bushing and the bearing sleeve 16) within roller rotational speed, applied radial load and lubricant viscosity operational design parameters. In the event that any of those operational parameters fall outside of design parameters—for example during mill stand start-up phase or slow speed rolling at high loads to achieve specific meturlugical properties—it is possible that the bearing 10 will not generate a sufficient hydrodynamic fluid film for desired operation. Lack of a fluid film increases potential for undesirable metal to metal contact between the bearing bushing and the roll neck 14/bearing sleeve 16 and potential bearing wear or failure. In the past, one or more hydrostatic bearing pads 30, 40 have been formed in the bearing bushing 20. The hydrostatic bearing pads 30, 40 are coupled to a source of pressurized fluid lubricant 50 in order to generate additional lubricant fluid film between the bearing bushing 20 and the roll neck 14/bearing sleeve 16. Oil film bearings that operate with both hydrodynamic and hydrostatic features are hybrid oil film bearings. Such bearings only function as "pure" hydrostatic bearings at a speed of 0 RPM; at any other speed they function with hybrid characteristics of both hydrostatic and hydrodynamic bearings combined.

Referring to FIGS. 1 and 2, the pressurized lubricant source 50 is fed to each of the respective bearing pads 30, 40 by a common lubricant passage 22 formed in an axial end of the bearing bushing 20 that branches to respective upstream passages 32, 42, flow restrictors 34, 44, and downstream passages 36, 46. The flow restrictors 34, 44 are typically visco-jets that isolate the respective bearing pads 30, 40 from each other in the event of an unexpected fluid film disruption in one of the pads that would facilitate rapid flow of lubricant through the disruption area and potential starvation of lubricant flow to the other otherwise normally functioning bearing pad. Multiple bearing bushings 20 in a mill roll stand share a common pressurized feed manifold 52 coupled to one or more pressurizing pumps 60. The pump 60 receives conditioned fluid lubricant (e.g., cooled and filtered oil of a desired viscosity range) via a pump inlet 62 and discharges higher pressurized oil via pump outlet 64 into the common oil feed manifold 52. Known rolling mill stand bearings are shown and described in U.S. Pat. Nos. 5,000,584 and 6,468,194, the entire contents of each of which is incorporated herein by reference as if fully set forth herein.

As previously described, one or more rolling mill bushings 20 having multiple hydrostatic bearing pads 30, 40 that share a common pressurized lubricant source (e.g., common manifold 52) reduce risk of simultaneously losing oil pressure through a leak in the common lubricant source restricting flow loss out of each bearing pad 30, 40 with a check valve at the junction of feed pipe 50 and bushings passages 42 and 32 (not shown). In the event of an oil pressure drop upstream of a flow restrictor 34, 44 partial pressure is maintained in the respective upstream lubricant passages 32, 42, so that the corresponding bearing pad is capable of maintaining a pressurized fluid film for at least a short time period. Similarly the flow restrictors 34, 44 slow pressurized lubricant flow into a respective bearing pad 30, 40 that has experienced a pressure failure. For example, absent use of the flow restrictors, if hydrostatic bearing pad 30 does not maintain a hydrostatic fluid film and experiences a rapid pressure drop, pressurized lubricant flow rate will increase into that bearing pad, possibly starving pressurized oil supply to the other pad 40 or other bearings that share the common pressurized oil supply.

Flow restrictors 34, 44 by their nature resist and inhibit oil flow therethrough as flow velocity increases, so additional fluid pressure is required to overcome the restrictions. In a typical rolling mill application an additional 3000 psi (20700 KPa) oil pressure must be generated to overcome visco-jet flow restrictors. Additional pressure requirements increase needed system pumping capacities and energy costs associated with operating the pumps.

SUMMARY

Accordingly, embodiments of the present invention include rolling mill hybrid hydrodynamic/hydrostatic bearings with respective hydrostatic pad recesses that provide for receipt of respective isolated sources of pressurized lubricant that are not impacted by lubricant pressure loss events associated with other pad recesses. The rolling mill bearings of the present invention allow for elimination of flow restrictors associated with hydrostatic pad recesses, and in turn their need for higher pressure lubricant supply necessary to overcome flow resistance associated with the flow restrictors. Operation of bearings of the present invention without flow restrictors can lower capital costs by procurement and use of lower pressure output lubricant pumps, as well as reduce energy consumption needed to operate lower pressure capacity pumps.

An exemplary embodiment of the present invention includes a hybrid hydrodynamic/hydrostatic fluid bearing bushing for a rolling mill of the type having a roll neck. The bushing comprises a generally annular bushing shell having an inner diameter surface for rotatively capturing a rolling mill roll neck therein. A plurality of hydrostatic pad recesses are defined within the inner diameter surface. The bearing bushing has a separate isolated lubricant passage in fluid communication with each respective hydrostatic pad. Each respective lubricant passage is adapted for coupling to a separate isolated source of pressurized lubricant.

Another embodiment of the present invention includes a hybrid hydrodynamic/hydrostatic fluid bearing system for a rolling mill of the type having a roll neck. The system includes a bearing bushing having a generally annular bushing shell in turn having an inner diameter surface for rotatively capturing a rolling mill roll neck therein. The bearing bushing has a plurality of hydrostatic pad recesses defined within the inner diameter surface, and a separate isolated lubricant passage in fluid communication with each respective hydrostatic pad. A separate isolated source of pressurized lubricant is coupled to each isolated lubricant passage.

An additional embodiment of the present invention is directed to a method for lubricating a hydrostatic bearing within a bearing system for a roll neck of rolling mill stand. The method comprises providing a bearing bushing having a generally annular bushing shell in turn having an inner diameter surface for rotatively capturing a rolling mill roll neck therein. The provided bearing bushing also has plurality of hydrostatic pad recesses defined within the inner diameter surface, and a separate isolated lubricant passage in fluid communication with each respective hydrostatic pad. The bearing bushing is installed in a rolling mill stand. A separate isolated source of pressurized lubricant is provided for each isolated lubricant passage. Each respective lubricant passage and source are coupled to provide for communication of the lubricant fluid there between.

The present invention rolling mill hybrid hydrodynamic/hydrostatic bearings incorporate bearing bushings with pluralities of hydrostatic pad recesses. Each recess has an isolated lubricant passage that is adapted for coupling to a separate isolated source of pressurized lubricant. In some embodiments herein, the isolated pressurized lubricant source is supplied by a dedicated outlet of a pressure pump. In this manner each hydrostatic pad recess has a dedicated pressurized lubricant supply that is not interrupted by loss of lubricant pressure events in other bearing pads within the rolling mill system.

The features of the present invention may be applied jointly or severally in any combination or sub-combination by those skilled in the art. Further features of embodiments of the present invention, and the advantages offered thereby, are explained in greater detail hereinafter with reference to specific embodiments illustrated in the accompanying drawings.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in rolling mill stand hybrid hydrodynamic/hydrodynamic bearing systems and pressurized lubricant supply systems for such bearings.

Figure 1:
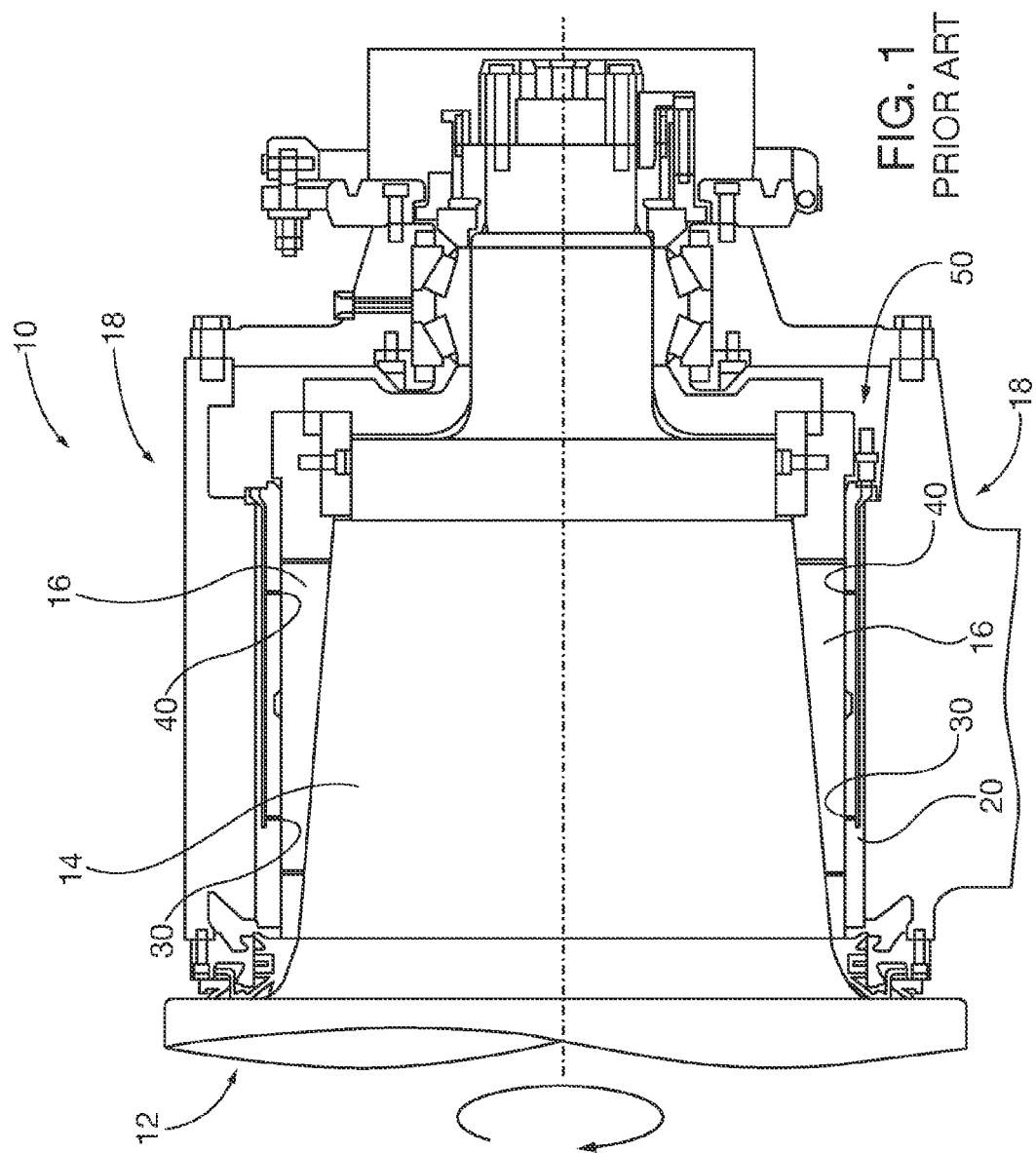
FIG. 1 shows a cross-sectional elevational view of a known rolling mill hybrid hydrodynamic/hydrostatic bearing having hydrostatic bearing pad recesses.
Figure 2:
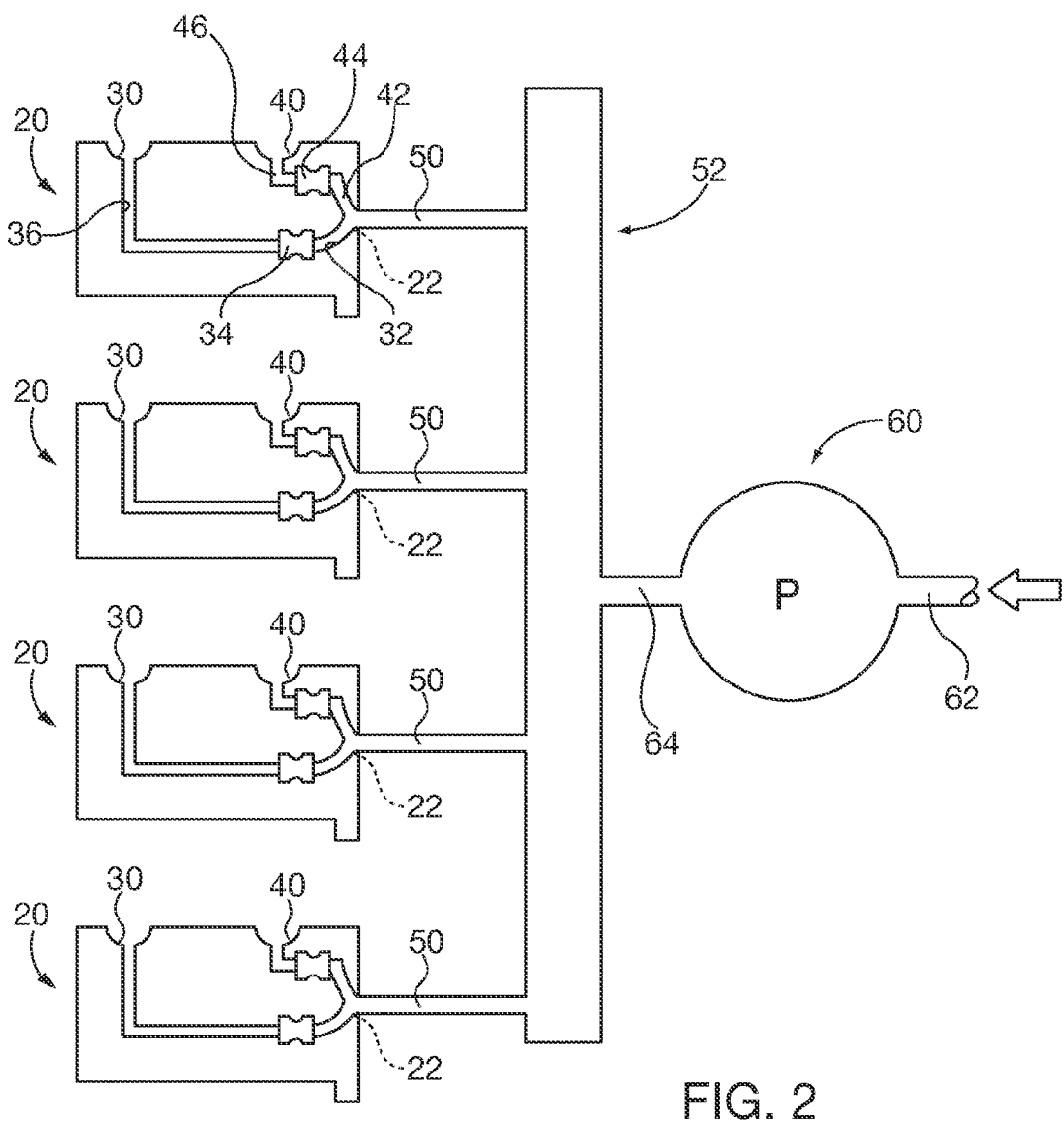
FIG. 2 shows a schematic view of a known hydrostatic bearing pad pressurized oil supply system for a hybrid hydrodynamic/hydrostatic bearing.
Figure 3:
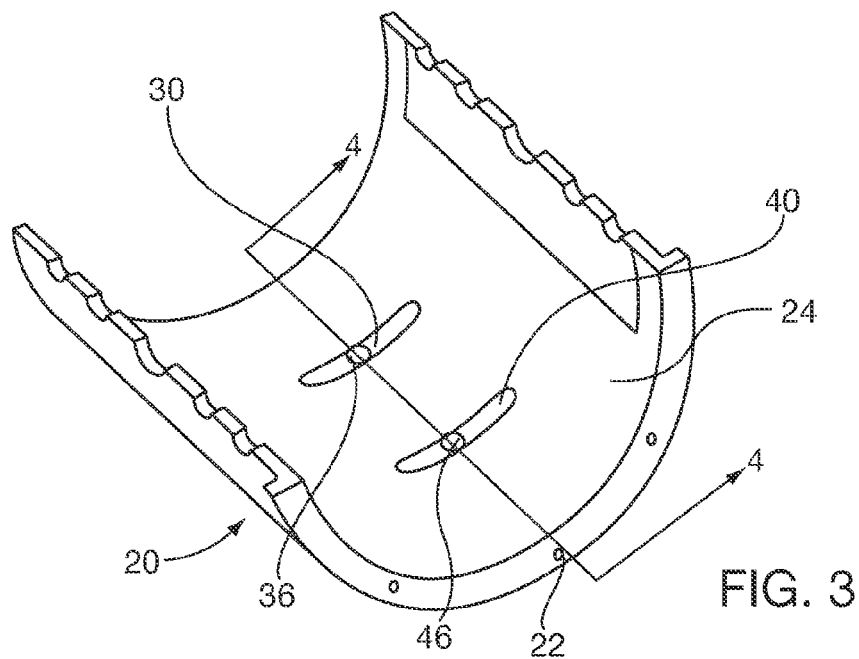
FIG. 3 shows a perspective view of a rolling mill hybrid bearing bushing in accordance with an exemplary embodiment of the present invention.
Figure 4:
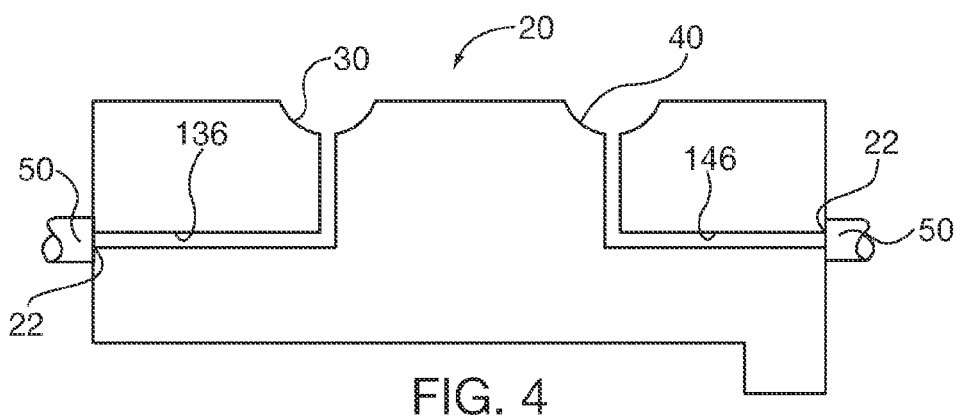
FIGS. 4 and 4A show respective cross-sectional views of alternative embodiments of isolated lubricant passages for supplying isolated sources of pressurized lubricant to hydrostatic pads of the hybrid bearing bushing, in accordance with exemplary embodiments of the present invention, taken along 4-4 of FIG. 3.
Figure 4A:
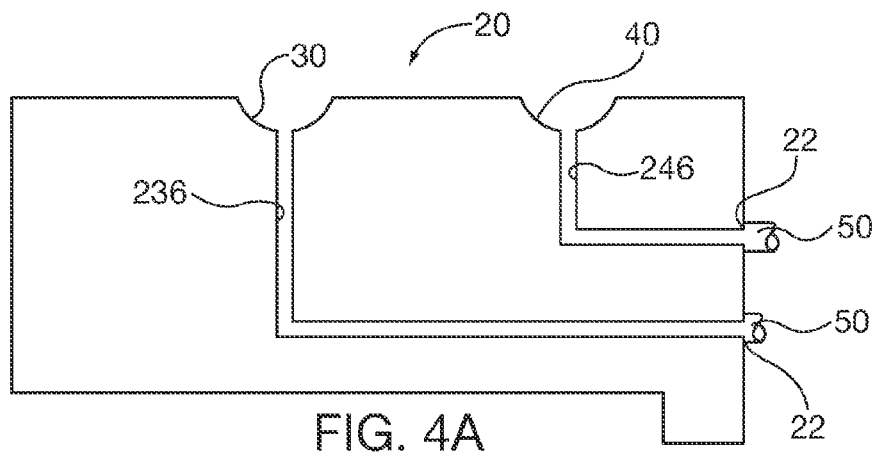

The general structural and operation of a rolling mill stand, its associated roller support bearings including hydrostatic bearing pads, and pressurized oil supply system commonly shared by multiple bearing pads has been previously described herein with reference to FIGS. 1 and 2, as well as in the previously incorporated by reference U.S. Pat. Nos. 5,000,584 and 6,468,194. FIGS. 3, 4 and 4A show embodiments of hybrid bearing bushings 20 of the present invention. The bearing bushing 20 has a generally annular bushing shell having an inner diameter surface 24 with a known babbit bearing lining material that is capable of forming a self-generating hydrodynamic lubricant film in cooperation with a rotating bearing sleeve 16 (see FIG. 1). Lubricant feed and supply features for the hydrodynamic portion of the bearing bushing are of known construction and for brevity are not discussed in detail herein. The bushing shell has a plurality of oil feed intake passages 22, respectively corresponding to each hydrostatic bearing pad recesses 30, 40 that are defined within the inner diameter surface 24.

In the embodiment of FIG. 4 respective separate isolated lubricant passages 136, 146 are defined within the bearing bushing 20 shell in fluid communication with each respective hydrostatic pad 30, 40. Each respective lubricant passage 136, 146 is in communication with an oil feed passage 22 that is formed in an axial end of the bearing bushing 20 shell that is proximal its respective bearing pads 30, 40. Each respective lubricant passage 22/136 and 22/146 is adapted for coupling to a separate isolated source of pressurized lubricant 50, that is shown as an oil supply line.

In the embodiment of FIG. 4A the respective lubricant passages 22/236 and 22/246 exit the same axial end of the bearing bushing shell 20 and as in the embodiment of FIG. 4 are adapted for coupling to a separate respective isolated source of pressurized lubricant, that are shown as oil supply lines 50.

Figure 5:
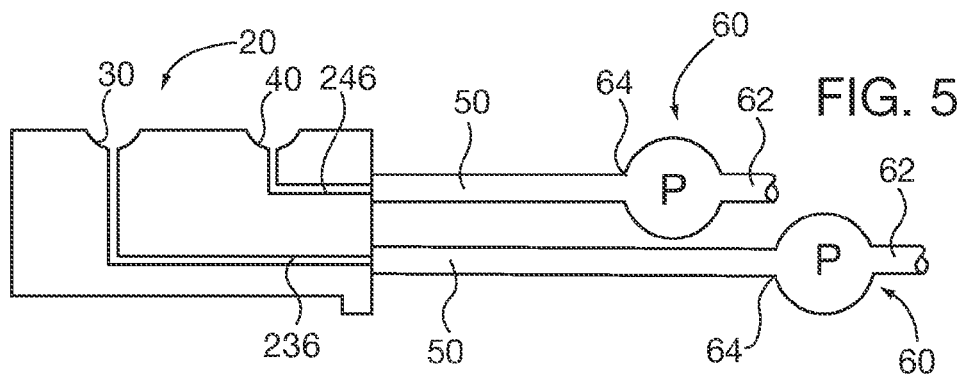
FIGS. 5-7 show schematic views of alternative embodiments of isolated pressurized lubricant supply systems for the hydrodynamic bearing portion of hybrid bearing bushings in accordance with exemplary embodiments of the present invention.
Figure 6:
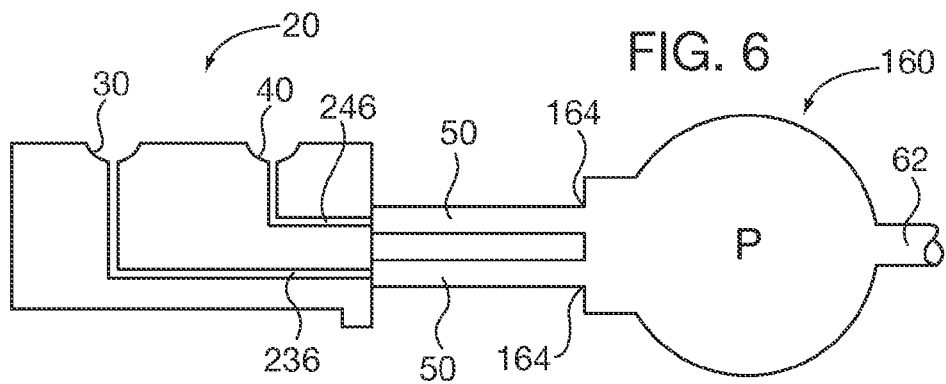
Figure 7:
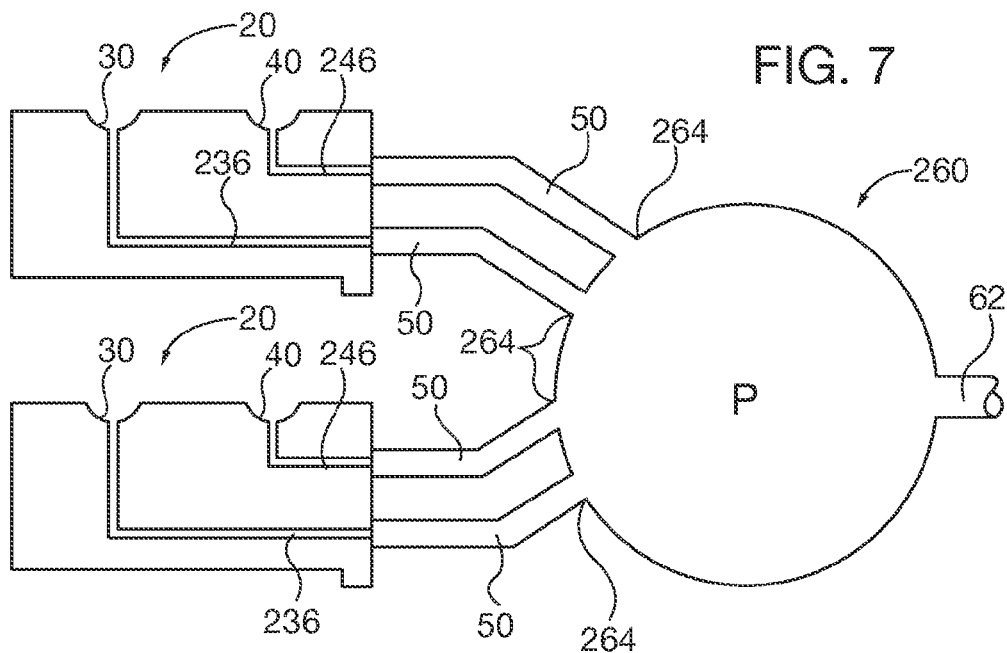

FIGS. 5-7 show schematically alternative embodiments of hydrostatic bearing pad lubricant supply systems that supply separate isolated sources of pressurized lubricant 50 to each separate bearing pad 30, 40. Disruption of lubricant supply flow or pressure to any one hydrostatic pad 30, 40—such as caused by an oil line leak or disruption in hydrostatic bearing film between a pad and the rolling mill roll neck 14/bearing sleeve 16—does not in and of itself disrupt supply to other hydrostatic pads in the rolling mill system, unless there is a general pressurization failure caused by one or more lubricant pump operational disruptions.

In FIG. 5, each hydrostatic bearing pad 30, 40 within bearing bushing 20 is supplied with pressurized lubricant by dedicated separate independent pumps 60, the respective outlets 64 of which are coupled thereto by respective oil lines 50 and oil passages 236, 246. In FIG. 6 a multi-outlet pump 160 supplies pressurized lubricant to each of the separate respective oil lines 50 and oil passages 236, 246 via separate dedicated outlets 164. The pump 160 is constructed so that a change in pressure within any one lubricant supply circuit to a hydrostatic bearing pad 30, 40 does not disrupt pressure supply to other lubricant supply circuits coupled to other ones of the pump outlets 164. A suitable type of independent multi-outlet pump suitable for use in practicing the present invention is a ball check pump. In FIG. 7, a four outlet or discharge ball check pump 260 simultaneously supplies pressurized lubricant to four separate hydrostatic bearing pads via four independent and isolated outlets 264. While exemplary embodiments of the present invention utilize ball check pumps, any type of pump may be used that provides one or more isolated outputs, so long as any one pump output circuit is not impacted by changes in output pressure of flow volume in another output circuit.

Figure 8:
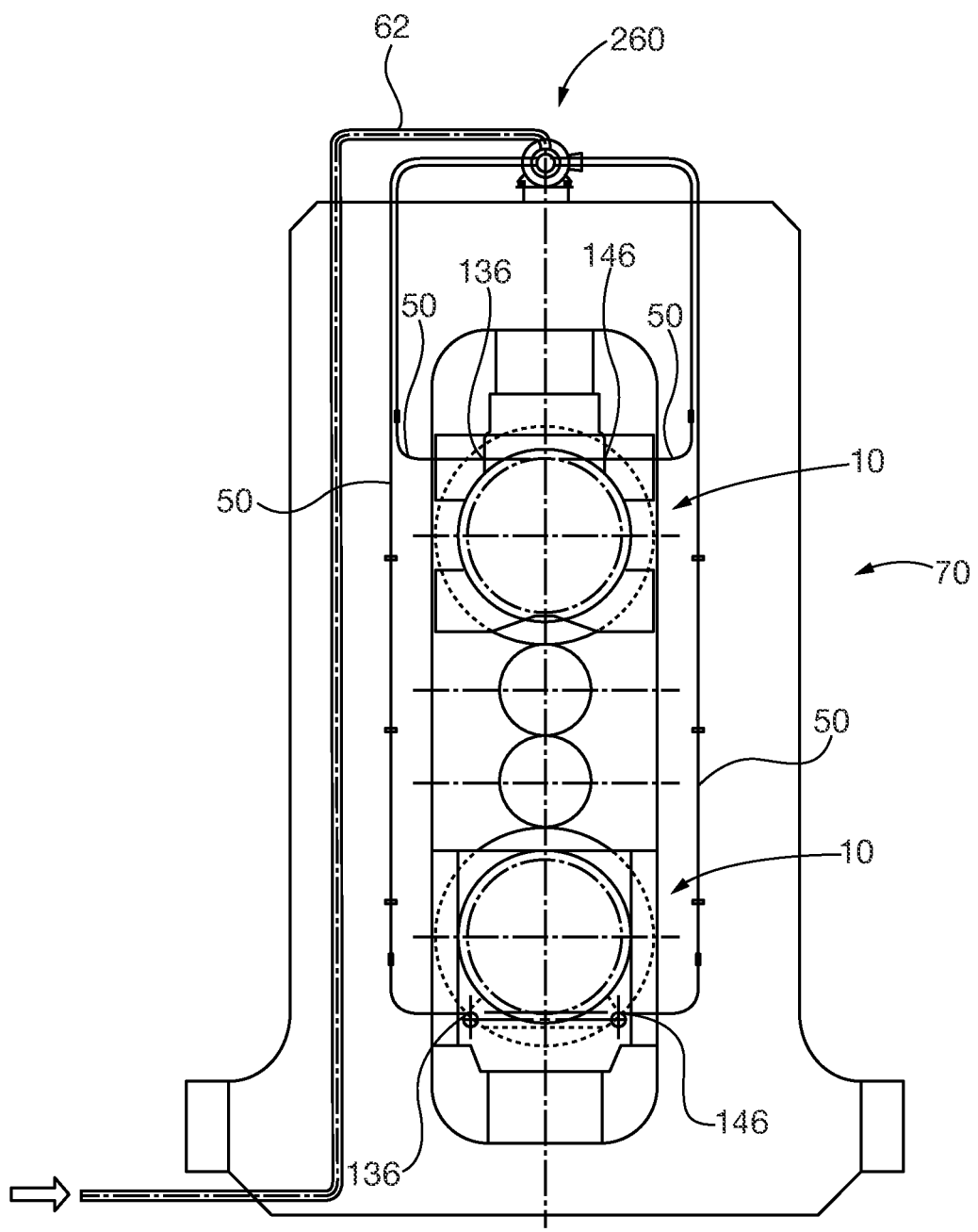
FIG. 8 shows a rolling mill stand housing incorporating hybrid bearing bushings and an isolated pressurized lubricant supply system, in accordance with an exemplary embodiment of the present invention.

FIG. 8 is a schematic representation of a rolling mill stand housing 70 having a pair of hydrodynamic and hydrostatic bearings 10 that rotatively support respective roll necks of mill rolls. A single stand housing 70 has a pair of hybrid hydrodynamic and hydrostatic bearings each with respective independent and isolated oil passages 136, 146 that are coupled to respective isolated and pressurized lubricant supply lines 50. Collectively each stand housing has four hydrostatic recess pads in pairs 30, 40 for each of the two bearings 10, for a total of four supply lines 50. Each supply line 50 is coupled to an outlet of a four discharge outlet ball check pump 260. Conditioned lubricant (e.g., filtered, cooled, etc.) is supplied to the ball check pump intake 62. Thus each mill stand housing 70 can be furnished with one stand-alone pressurized lubricant supply pump 260.

Although various embodiments which incorporate the teachings of the present invention have been shown and described in detail herein, those skilled in the art can readily devise many other varied embodiments that still incorporate these teachings.

What is claimed is:

1. A hybrid hydrodynamic and hydrostatic fluid bearing system for a rolling mill roll of the type having a roll neck, the system comprising:
   a sleeve mounted on the roll neck for rotation therewith;
   a bearing bushing comprising:
      a generally annular bushing shell with an inner diameter surface for rotatively capturing the sleeve therein;
      a plurality of hydrostatic pad recesses defined within the inner diameter surface;
      a plurality of pump outlets providing separate isolated sources of pressurized lubricant; and
      a plurality of lubricant passages, each lubricant passage being in communication with only one hydrostatic pad recess and only one pump outlet to thereby define one of a plurality of lubricant supply circuits, the lubricant supply circuits being arranged such that a change in pressure within any one lubricant supply circuit does not disrupt the pressure supply to other lubricant supply circuits coupled to other ones of the pump outlets.

2. The system of claim 1, wherein each lubricant passage is formed within the bushing shell and is in communication with an axial end of the bushing shell.

3. The system of claim 1, having a pair of hydrostatic pad recesses and a pair of respective lubricant passages, and further comprising a hydrodynamic bearing defined within the inner diameter surface.

4. The system of claim 1, further comprising a separate respective independent pump coupled to each respective lubricant passage.

5. The system of claim 1, further comprising a pump having a plurality of pump outlets respectively coupled to each respective lubricant passage.

6. The system of claim 5 wherein the pump is a ball check pump.

7. The system of claim 3 further comprising:
   a rolling mill stand having a pair of bearing bushings each respectively capturing a respective the sleeve therein;
   the pair of bearing bushings collectively having four separate lubricant passages; and
   a ball check pump having at least four isolated outlets respectively coupled to each of the four respective lubricant passages.

8. A method for lubricating a hydrostatic bearing within a bearing system for a roll neck of rolling mill stand, the method comprising:
   providing a sleeve mounted on the roll neck for rotation therewith;
   providing a bearing bushing having:
      a generally annular bushing shell with an inner diameter surface for rotatively capturing a rolling mill roll neck therein;
      a plurality of hydrostatic pad recesses defined within the inner diameter surface; and
      installing the bearing bushing in a rolling mill stand;
   providing a plurality of pump outlets, each of which provides an isolated source of pressurized lubricant;
   providing a plurality of lubricant passages, with each lubricant passage being in communication with only one hydrostatic pad recess and only one pump outlet to thereby define one of a plurality of lubricant supply circuits, the lubricant supply circuits being arranged such that a change in pressure within any one lubricant supply circuit does not disrupt the pressure supply to other lubricant supply circuits coupled to other ones of the pump outlets.

9. The method of claim 8, wherein the pressurized lubricant source is selected from the group consisting of a separate independent single outlet lubricant pressurizing pump coupled to a lubricant passage, a lubricant pressurizing pump having a plurality of isolated outlets coupled to respective lubricant passages or a ball check pump having multiple isolated outlets coupled to respective lubricant passages.

10. The method of claim 8, further comprising:
    providing a pair of bearing bushings in a rolling mill stand housing, each respective bushing having: a pair of hydrostatic pad recesses and a pair of respective isolated lubricant passages, and further comprising a hydrodynamic bearing defined within the inner diameter surface; and
    wherein the pressurized lubricant source is at least one ball check pump having multiple respective isolated outlets coupled to a respective lubricant passage.

11. The method of claim 8 further comprising:
    removing an existing bearing bushing before the installing step; and
    wherein the pressurized lubricant source is at least one ball check pump having multiple respective isolated outlets coupled to a respective lubricant passage.

* * * * *